United States Patent
Peng et al.

(10) Patent No.: US 9,578,146 B2
(45) Date of Patent: Feb. 21, 2017

(54) ELECTRONIC ASSEMBLY AND ELECTRONIC APPARATUS

(71) Applicant: HTC Corporation, Taoyuan County (TW)

(72) Inventors: Ming-Chieh Peng, Taoyuan County (TW); San-Chi Ho, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 225 days.

(21) Appl. No.: 14/325,382

(22) Filed: Jul. 8, 2014

(65) Prior Publication Data

US 2016/0014924 A1    Jan. 14, 2016

(51) Int. Cl.
*H04M 1/02* (2006.01)
*G06F 1/16* (2006.01)
*H01M 4/02* (2006.01)

(52) U.S. Cl.
CPC .............. *H04M 1/0262* (2013.01); *G06F 1/16* (2013.01); *G06F 1/1626* (2013.01); *H04M 1/0277* (2013.01); *H01M 2004/025* (2013.01)

(58) Field of Classification Search
CPC ....................... H01M 2004/025; H04M 1/0262
USPC ........................................... 361/760; 429/163
See application file for complete search history.

(56) References Cited

U.S. PATENT DOCUMENTS

| | | | | |
|---|---|---|---|---|
| 5,958,088 | A * | 9/1999 | Vu ........................ | H01M 2/021 29/623.1 |
| 6,020,086 | A * | 2/2000 | Van Lerberghe ... | H01M 2/0207 429/127 |
| 6,599,659 | B1 * | 7/2003 | Endo ..................... | H01M 2/021 29/623.2 |
| 7,163,762 | B2 * | 1/2007 | Endo ..................... | H01B 1/122 429/163 |
| 7,704,633 | B2 * | 4/2010 | Endo ..................... | H01B 1/122 429/163 |
| 2011/0097615 | A1 * | 4/2011 | Goh ..................... | H01M 2/0275 429/94 |
| 2013/0108907 | A1 * | 5/2013 | Bhardwaj ............ | H01M 10/0431 429/94 |
| 2013/0308282 | A1 * | 11/2013 | Shin ...................... | H05K 7/14 361/749 |

(Continued)

FOREIGN PATENT DOCUMENTS

| | | |
|---|---|---|
| CN | 103428316 | 12/2013 |
| TW | 201424089 | 6/2014 |

OTHER PUBLICATIONS

"Office Action of Taiwan Counterpart Application", issued on Dec. 1, 2015, p. 1-p. 6.

*Primary Examiner* — Adrian S Wilson
(74) *Attorney, Agent, or Firm* — Jianq Chyun IP Office

(57) ABSTRACT

An electronic assembly including a housing, a circuit board, and a battery module is provided. The housing has an accommodating space and at least a portion of the housing is curved surface. The circuit board is disposed in the accommodating space. The battery module is disposed in the accommodating space and stacked on the circuit board, wherein at least a portion of the battery module is located between the housing and the circuit board, and at least a portion of the battery module is bent and corresponded to the curved surface of the housing. An electronic apparatus including the electronic assembly aforementioned is also provided.

20 Claims, 5 Drawing Sheets

(56) References Cited

U.S. PATENT DOCUMENTS

2014/0113184 A1* 4/2014 Hamel .............. H01M 10/0436
429/179
2016/0021226 A1* 1/2016 Allore ................ H04M 1/0262
455/566

* cited by examiner

ELECTRONIC ASSEMBLY AND ELECTRONIC APPARATUS

BACKGROUND OF THE APPLICATION

1. Field of the Application

The application generally relates to an electronic apparatus, and more particularly, to an electronic assembly and an electronic apparatus adopting the electronic assembly.

2. Description of Related Art

In recent years, as the technology advances, handheld devices such as mobile phones, tablet computers are more commonly used and are developed to be more convenient, multi-functional and exquisite. More and more choices like the aforementioned are provided for consumers to choose from. Users have higher demands toward the handheld devices day by day. As the time prolongs for users to hold handheld devices by hands, the feeling in holding handheld devices are getting more important.

In order to enhance the feeling in holding handheld devices, a housing surface of handheld electronic apparatuses is often designed to have a curved surface for complying with ergonomic designs. However, according to the current stacking method of interior space of handheld devices, a battery is closer to a housing of a handheld device than a motherboard, and therefore such handheld device cannot present a smooth arc shape due to the battery disposition.

SUMMARY OF THE APPLICATION

The present application is directed to an electronic assembly enabling a housing to have a smooth and curved surface, and an electronic apparatus adopting the electronic assembly.

The electronic assembly of the present application includes a housing, a circuit board and a battery module. The housing has an accommodating space, and at least a portion of the housing is a curved surface. The circuit board is disposed in the accommodating space. The battery module is disposed in the accommodating space and stacked on the circuit board, wherein at least a portion of the battery module is located between the housing and the circuit board, and at least a portion of the battery module is bent and corresponded to the curved surface of the housing.

The electronic apparatus of the present application includes the said electronic assembly and a display module. The display module is disposed in the accommodating space, wherein the circuit board is located between the battery module and the display module.

In view of the foregoing, sine the battery module of the present application is stacked on the circuit board, wherein at least a portion of the battery module is located between the housing and the circuit board, and at least a portion of the battery module is bent and corresponded to the curved surface of the housing, the electronic assembly and the electronic apparatus adopting the electronic assembly may have a housing with smooth appearance, and the space inside the housings may be effectively used. On the other hand, the battery module may have larger battery capacity, thereby enhancing the durability of the electronic apparatus adopting the electronic assembly in use.

To make the aforementioned and other features and advantages of the application more comprehensible, several embodiments accompanied with drawings are described in detail as follows.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION OF THE EMBODIMENTS

Figure 1:
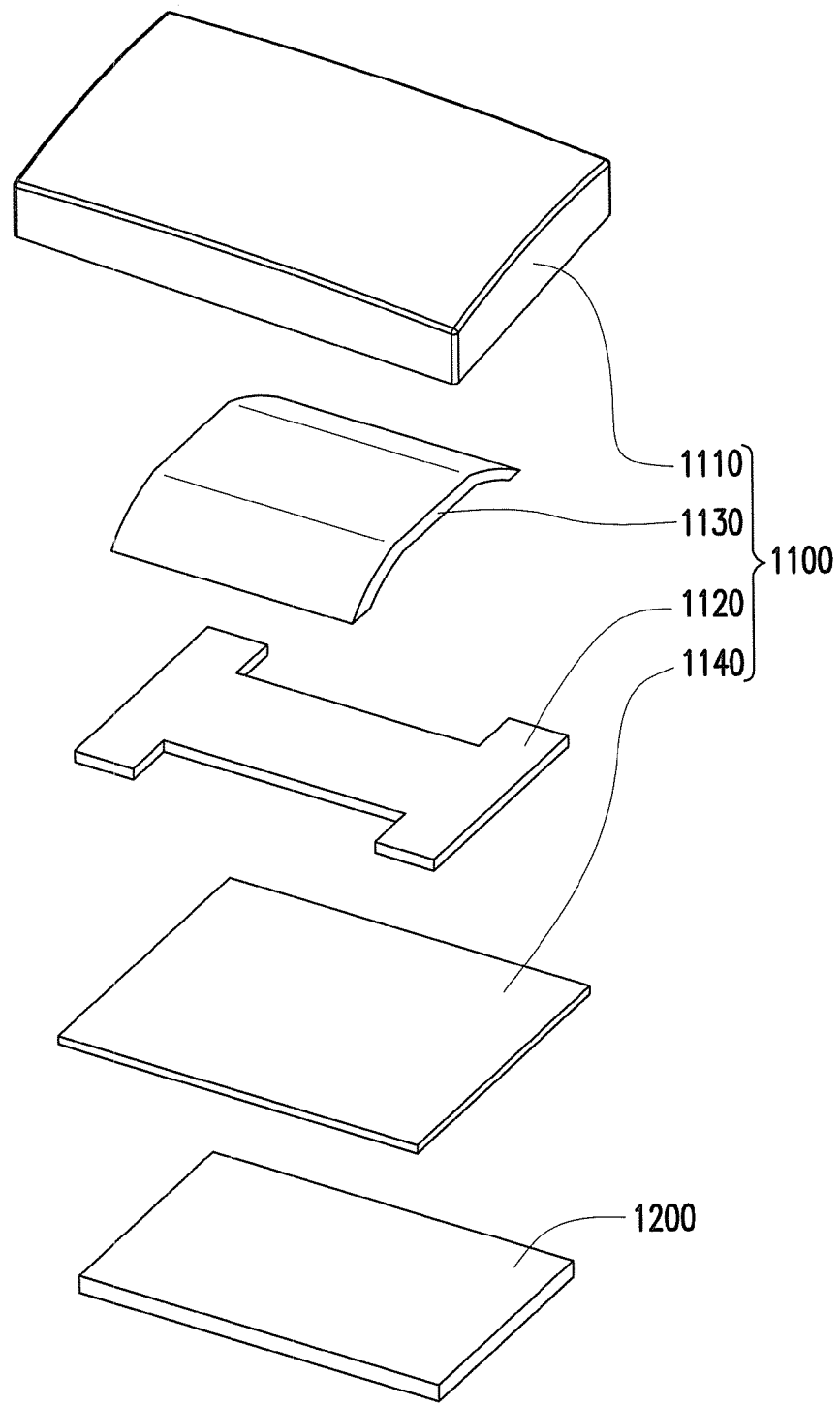
FIG. 1 is an exploded view of an electronic apparatus according to an embodiment of the application.
Figure 2:
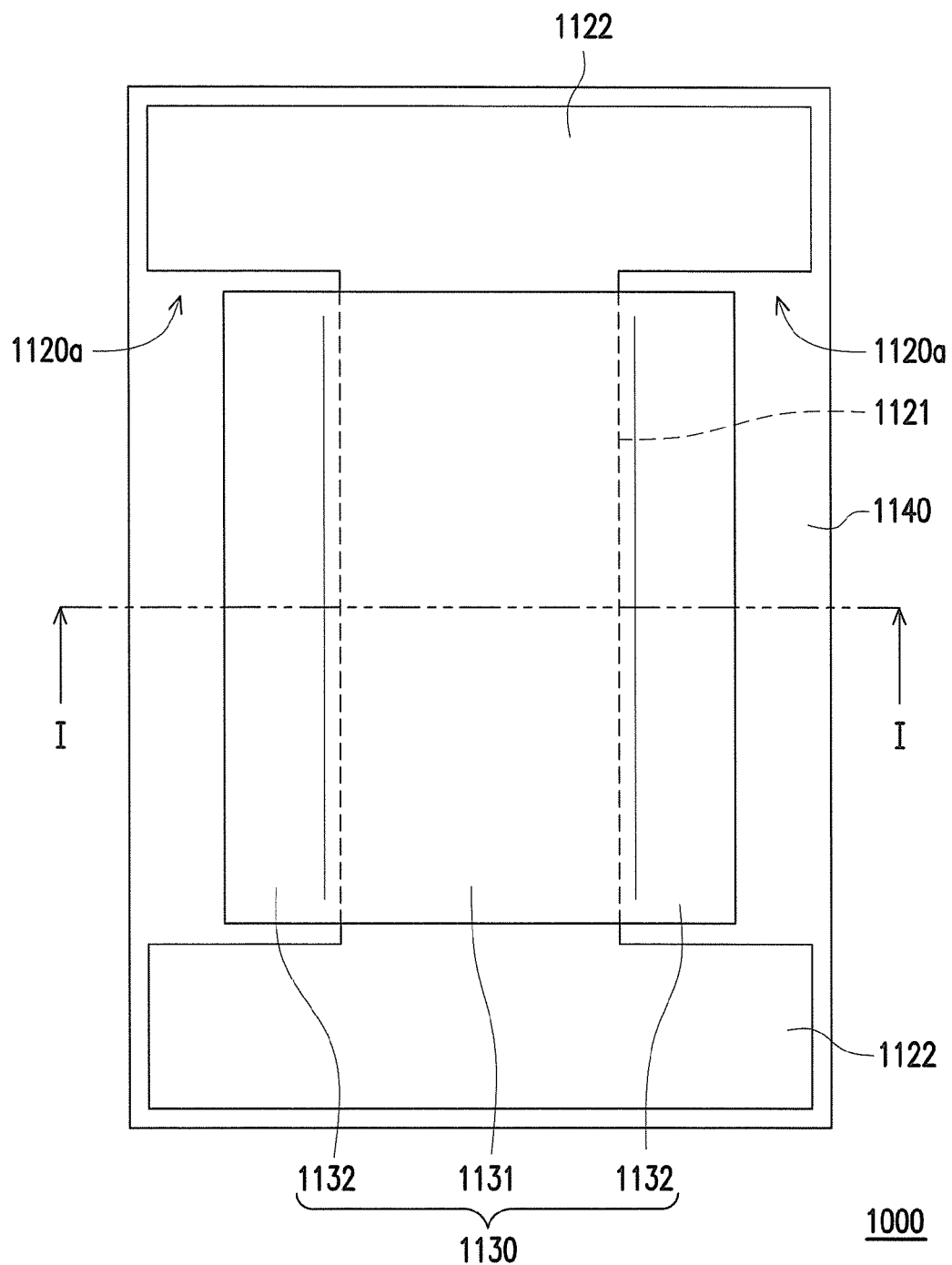
FIG. 2 is a rear view of an assembled electronic apparatus of FIG. 1.
Figure 3:
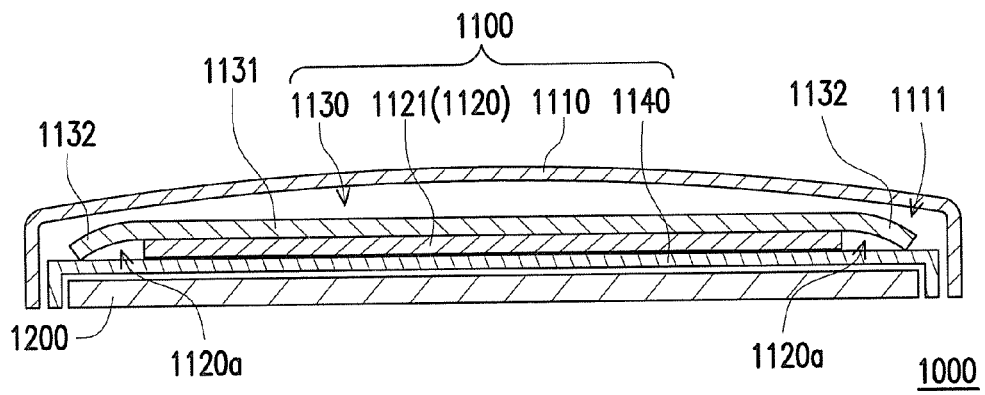
FIG. 3 is a cross-sectional view of the electronic apparatus along a section line I-I of FIG. 2.

FIG. 1 is an exploded view of an electronic apparatus according to an embodiment of the application. FIG. 2 is a rear view of an assembled electronic apparatus of FIG. 1. FIG. 3 is a cross-sectional view of the electronic apparatus along a section line I-I of FIG. 2, wherein for the clarity of illustration and description, the illustration of a housing 1110 is omitted in FIG. 2. Referring to FIG. 1 through FIG. 3, in the present embodiment, an electronic apparatus 1000, for example, is a Smart Phone, a Tablet PC, or other electronic apparatus of similar form. The electronic apparatus 1000 includes an electronic assembly 1100 and a display module 1200. The display module 1200, for example, is a liquid display module (LCD) or an organic light emitting display (OLED) which is capable of being embedded or applied with transparent touch lines for simultaneously providing touch functions.

The electronic assembly 1100 includes a housing 1110, a circuit board 1120 and a battery module 1130. The housing 1110 has an accommodating space 1111, and at least a portion of the housing 1110 is a curved surface, wherein a material thereof may be metal, plastic, acrylic, carbon fiber or composite material. The circuit board 1120, for example, is a rigid circuit board disposed in the accommodating space 1111. The battery module 1130 is disposed in the accommodating space 1111 and stacked on the circuit board 1120, wherein at least a portion of the battery module 1130 is located between the housing 1110 and the circuit board 1120, and at least a portion of the battery module 1130 is bent and corresponded to the curved surface of the housing 1110. The display module 1200 is disposed in the accommodating space 1111, and the circuit board 1120, being illustrated along the section line I-I, is located between the battery module 1130 and display module 1200.

In the present embodiment, the circuit board 1120 has two edge-openings 1120a, and the two edge-openings 1120a, for example, are recesses formed at two opposite sides of the circuit board 1120. For example, the circuit board 1120 may have a structure similar to an I-shape, which is defined into a central portion 1121 and two extending portions 1122.

The battery module 1130 has a main portion 1131 and two bended portions 1132, wherein the two bended portions 1132 are located at two opposite sides of the main portion 1131, and each bended portion 1132 extends into the corresponding edge-openings 1120a. That is, within the limited accommodating space 1111, the battery module 1130 may still have larger volume for increasing the battery capacity thereof under a condition of not influencing an overall thickness of the electronic apparatus 1000, thereby enhancing the durability of the electronic apparatus 1000 in use. On the other hand, since a surface of the battery module 1130 facing towards the housing 1110 is a curved surface, the appearance of the housing 1110 may present a smooth arc shape so as to comply with ergonomic designs.

Referring to FIG. 2 and FIG. 3, in the present embodiment, the battery module 1130 covers the central portion 1121 of the circuit board 1120 and exposes the two extending portions 1122, wherein the main portion 1131 of the battery module 1130 leans against the central portion 1121 of the circuit board 1120, so as to reduce the overall thickness of the electronic apparatus 1000 while increasing the battery capacity. Herein, the battery module 1130 may be formed by superimposing a plurality of flexible battery plates, and thus according to actual design requirements, such as an appearance design of the electronic apparatus 1000, some portions of the battery module 1130 may be subjected to moderate bending so as to assemble the battery module 1130 inside the electronic apparatus 1000. On the other hand, since the flexible battery plates are relatively thin in thickness, when increasing the battery capacity of the battery module 1130 by superimposing more battery plates, the overall thickness of the battery module 1130 may still comply with a design requirement in thinning the electronic apparatus 1000.

Referring to FIG. 1 and FIG. 3, in the present embodiment, the electronic assembly 1100 further includes a frame 1140 disposed between the circuit board 1120 and the display module 1200 for fixing the circuit board 1120 and the display module 1200. Specifically, the circuit board 1120 and the display module 1200 are respectively fixed on the frame 1140, and the circuit board 1120, being illustrated along the section line I-I, is located between the battery module 1130 and the frame 1140.

Figure 4:
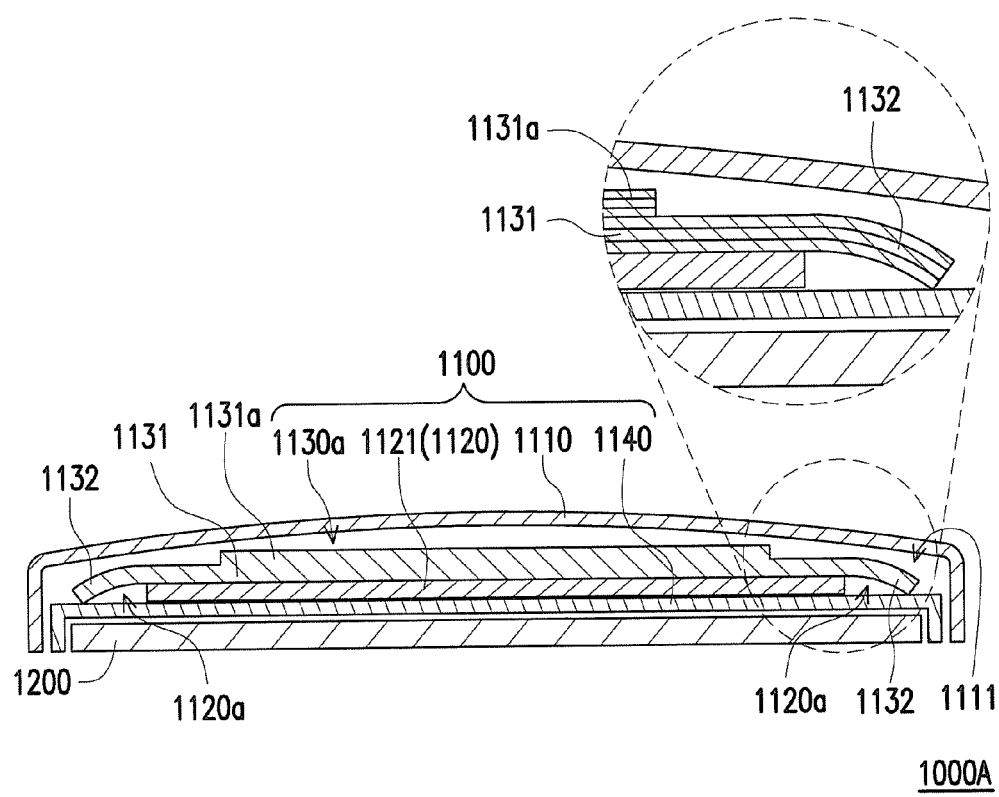
FIG. 4 is a cross-sectional view of an electronic apparatus according to another embodiment of the application.

FIG. 4 is a cross-sectional view of an electronic apparatus according to another embodiment of the application. Referring to FIG. 4, a difference between an electronic apparatus 1000A of FIG. 4 and the electronic apparatus 1000 of FIG. 3 lies in that: in the present embodiment, the main portion 1131 of the battery module 1130a further has a protruding portion 1131a, and the protruding portion 1131a extends towards the housing 1110. As such, the battery module 1130a may have larger battery capacity, thereby enhancing the durability of the electronic apparatus 1000A in use. As shown in a partially enlarged view of FIG. 4, the protruding portion 1131a, for example, is formed by superimposing a plurality of battery plates, and is therefore attached to the main portion 1131, wherein the main portion 1131 and the bended portions 1132 connected to the two opposite sides of the main portion 1131 may also be formed by superimposing a plurality of battery plates. Herein, an area of each battery plate that constitutes the protruding portion 1131a is smaller than an area of each battery plate that constitutes the main portion 1131.

Figure 5:
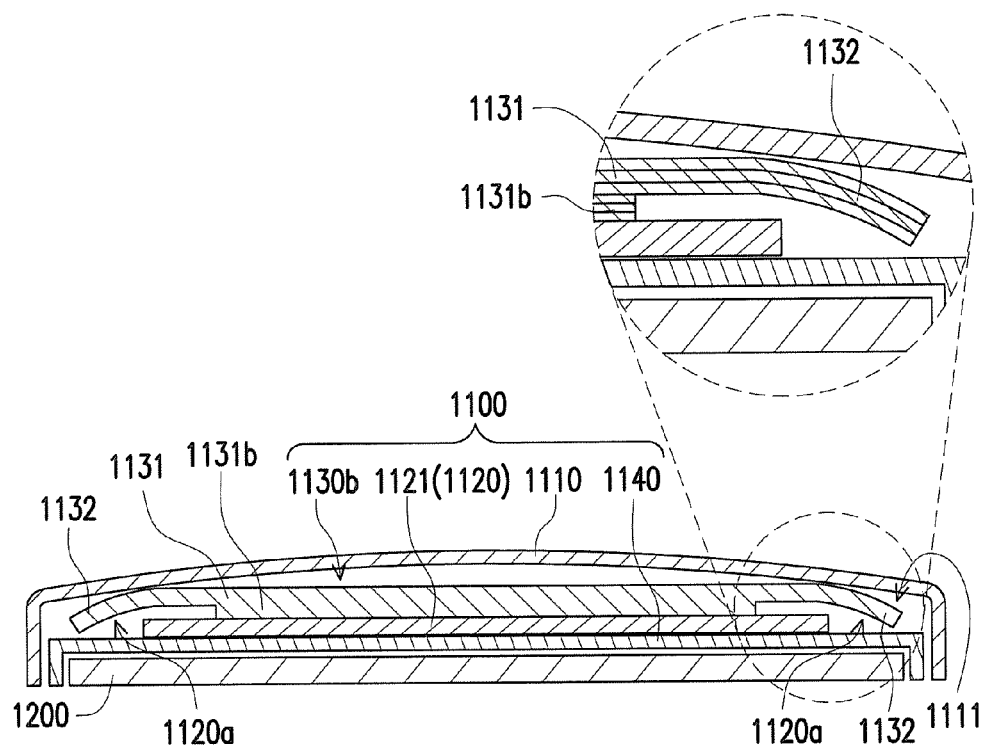
FIG. 5 is a cross-sectional view of an electronic apparatus according to yet another embodiment of the application.

FIG. 5 is a cross-sectional view of an electronic apparatus according to yet another embodiment of the application. Referring to FIG. 5, a difference between an electronic apparatus 1000B of FIG. 5 and the electronic apparatus 1000A of FIG. 4 lies in that: in the present embodiment, the protruding portion 1131b of the main portion 1131 of the battery module 1130b extends towards the central portion 1211 of the circuit board 1120 and is attached to the central portion 1211 of the circuit board 1120. Accordingly, the battery module 1130b may also have a large batter capacity, thereby enhancing the durability of the electronic apparatus 1000B in use. On the other hand, based on similar design principles of the battery module 1130a, the protruding portion 1131b and the main portion 1131 herein, and the bended portion 1132 connected to the two opposite sides of the main portion 1131, may also respectively formed by superimposing a plurality of battery plates with different sizes in area, wherein the protruding portion 1131b formed by superimposing the battery plates with smaller areas is attached to the main portion 1131, as shown in a partial enlarged view of FIG. 5.

Figure 6:
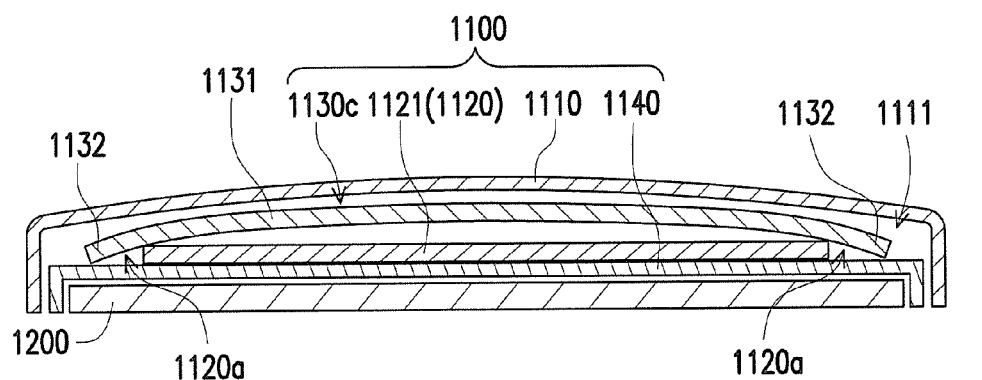
FIG. 6 is a cross-sectional view of an electronic apparatus according to still another embodiment of the application.

FIG. 6 is a cross-sectional view of an electronic apparatus according to still another embodiment of the application. Referring to FIG. 6, differences between an electronic apparatus 1000C of FIG. 6 and the electronic apparatus 1000 of FIG. 3 lie in that: in the present embodiment, an overall profile of the battery module 1130c appears to be arc-shaped, and the main portion 1131 of the battery module 1130c, being illustrated along the section line I-I, is not attached to the central portion 1211 of the circuit board 1120, such that a junction between the main portion 1131 and the bended portion 1132 is leaned against two opposite edges of the central portion 1211. Accordingly, the battery module 1130c may also have larger battery capacity, thereby enhancing the durability of the electronic apparatus 1000C in use.

Figure 7A:
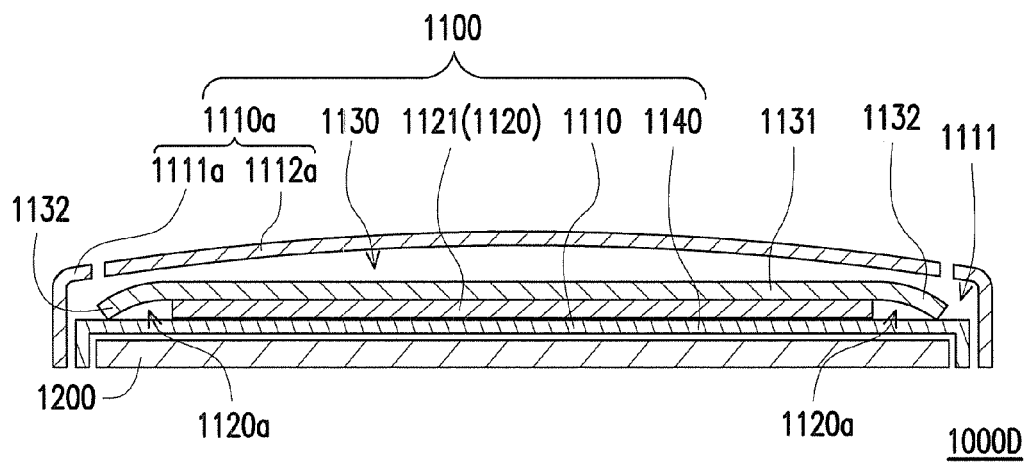
FIG. 7A is a cross-sectional view of an electronic apparatus according to yet another embodiment of the application.
Figure 7B:
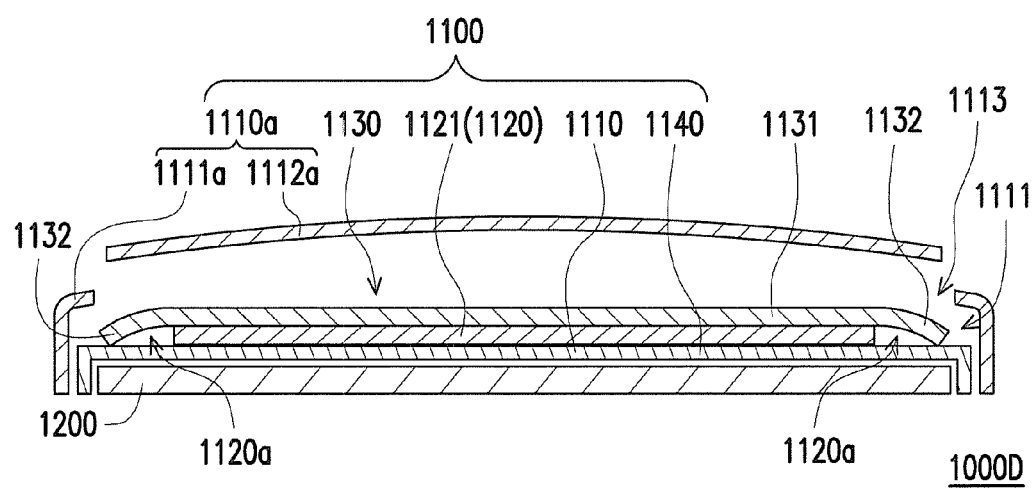
FIG. 7B is a schematic diagram illustrating a cover of FIG. 7A being detached from a main body.

FIG. 7A is a cross-sectional view of an electronic apparatus according to yet another embodiment of the application. FIG. 7B is a schematic diagram illustrating a cover of FIG. 7A being detached from a main body. Referring to FIG. 7A and FIG. 7B, in the present embodiment, a difference between an electronic apparatus 1000D and the electronic apparatus 1000 of FIG. 3 lies in that: the housing 1110a may have a main body 1111a and a cover 1112a, wherein the cover 1112a is detachably assembled to the main body 1111a so as to enable a user to manually detach the cover 1112a from the main body 1111a. When the cover 1112a is detached from the main body 1111a to expose an opening 1113 of the main body 1111a, the user may remove the battery module 1130 stacked on the circuit board 1120 from the accommodating space 1111 through the opening 1113. Although, herein the electronic apparatus 1000D is described as being configured with the battery module 1130, in other embodiments, the electronic apparatus 1000D may also selectively be configured the battery module 1130a, 1130b or 1130c, such that the application is not limited thereto.

In summary, since the battery module of the application is stacked on the circuit board, wherein at least a portion of the battery module is located between the housing and the circuit board, and at least a portion of the battery module is bent and corresponded to the curved surface of the housing, the electronic assembly and the electronic apparatus adopting this electronic assembly may have a housing with smooth appearance, and the space inside the housings may be effectively used. On the other hand, the battery module may have larger battery capacity, thereby enhancing the durability of the electronic apparatus adopting the electronic assembly in use.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. An electronic assembly, comprising:
   a housing having an accommodating space, and at least a portion of the housing is a curved surface;
   a circuit board disposed in the accommodating space, and the circuit board has at least one edge opening; and
   a battery module disposed in the accommodating space and stacked on the circuit board, wherein at least a portion of the battery module is located between the housing and the circuit board, and at least a portion of the battery module is bent and corresponded to the curved surface of the housing,
   wherein the battery module has a main portion and at least one bended portion, the at least one bended portion and the at least one edge opening are located at least one side of the main portion, and the at least one bended portion extends into the at least one edge opening.

2. The electronic assembly of claim 1, wherein the main portion is plate-shape corresponding to the circuit board.

3. The electronic assembly of claim 2, wherein an amount of the at least one bended portion is two, and the two bended portions are located at two opposite sides of the main portion.

4. The electronic assembly of claim 3, wherein an amount of the at least on edge opening is two, and the two edge-openings are located at two opposite sides of the circuit board.

5. The electronic assembly of claim 4, wherein the circuit board comprises a central portion and two extending portions, the two extending portions are disposed at the two opposite sides of the central portion so as to form an I-shaped structure.

6. The electronic assembly of claim 2, wherein the main portion leans against a least a portion of the circuit board.

7. The electronic assembly of claim 2, wherein the main portion has a protruding portion, and the protruding portion extends towards the housing or the circuit board.

8. The electronic assembly of claim 1, wherein the battery module covers at least a portion of the circuit board.

9. The electronic assembly of claim 1, further comprising:
   a frame disposed in the accommodating space, wherein the circuit board is fixed on the frame.

10. The electronic assembly of claim 1, wherein the housing has a main body and a cover, the cover is detachably assembled to the main body, and when the cover is detached from the main body to expose an opening of the main body, the battery module is adapted to remove the accommodating space through the opening.

11. An electronic apparatus, comprising:
    an electronic assembly, comprising:
    a housing having an accommodating space, and a least a portion of the housing is a curved surface;
    a circuit board disposed in the accommodating space, and the circuit board has at least one edge opening; and
    a battery module disposed in the accommodating space and stacked on the circuit board, wherein at least a portion of the battery module is located between the housing and the circuit board, and at least a portion of the battery module is bent and corresponded to the curved surface of the housing,
    wherein the battery module has a main portion and at least one bended portion, the at least one bended portion and the at least one edge opening are located at least one side of the main portion, and the at least one bended portion extends into the at least one edge opening; and
    a display module disposed in the accommodating space, wherein the circuit board is located between the battery module and the display module.

12. The electronic apparatus of claim 11, wherein the main portion is in plate-shape corresponding to the circuit board.

13. The electronic apparatus of claim 12, wherein an amount of the at least one bended portion is two, and the two bended portions are located at two opposite sides of the main portion.

14. The electronic apparatus of claim 13, wherein an amount of the at least one edge opening is two, and the two edge-openings are located at two opposite sides of the circuit board.

15. The electronic apparatus of claim 14, wherein the circuit board comprises a central portion and two extending portions, the two extending portions are disposed at two opposite sides of the central portion so as to form an I-shaped structure.

16. The electronic apparatus of claim 12, wherein the main portion leans against at least a portion of the circuit board.

17. The electronic apparatus of claim 12, wherein the main portion has a protruding portion, and the protruding portion extends towards the housing and the circuit board.

18. The electronic apparatus of claim 11, wherein the battery module covers at least a portion of the circuit board.

19. The electronic apparatus of claim 11, wherein the electronic assembly further comprises:
    a frame disposed in the accommodating space, wherein the circuit board is fixed on the frame.

20. The electronic apparatus of claim 11, wherein the housing has a main body and a cover, the cover is detachably assembled to the main body, and when the cover is detached from the main body to expose an opening of the main body, the battery module is adapted to remove the accommodating space through the opening.

* * * * *